June 13, 1967 HIROSHI YAMAMURA ETAL 3,325,113
FILM MAGAZINE FOR A MOVIE CAMERA
Filed Sept. 24, 1965
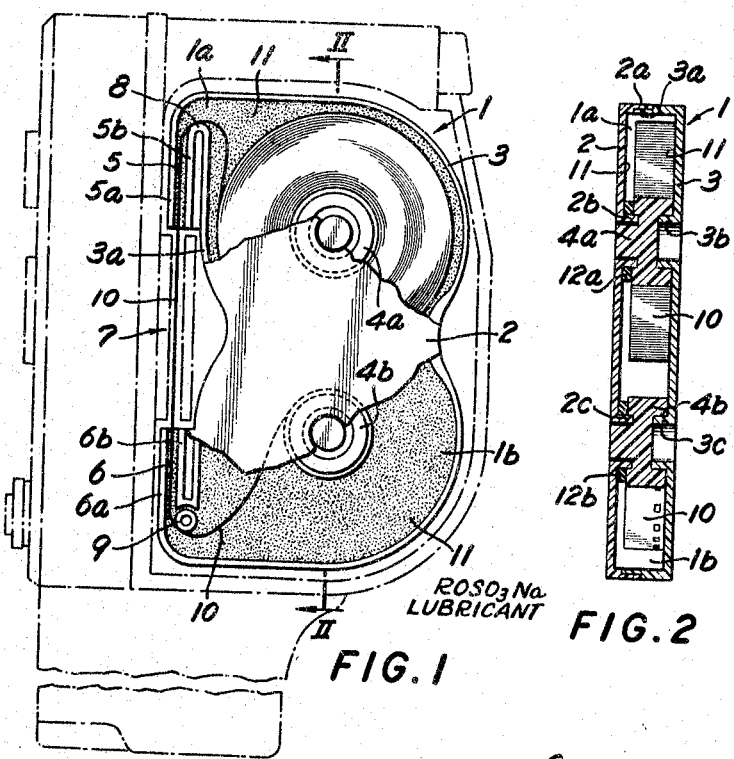
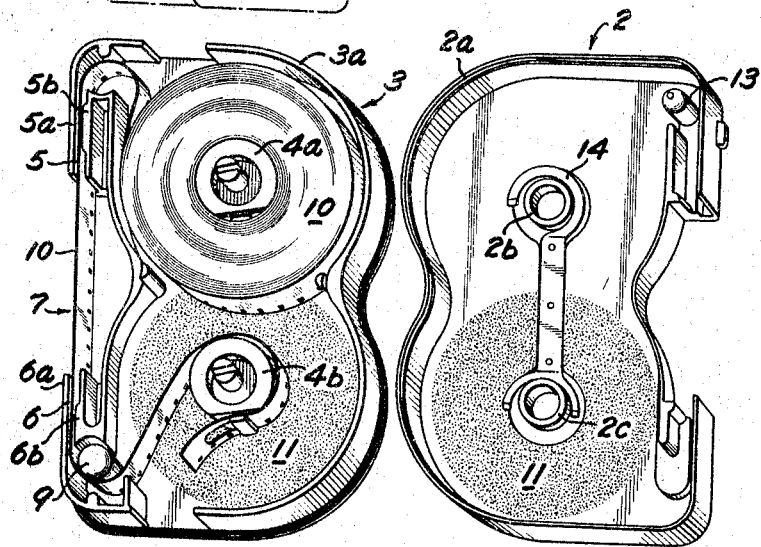
INVENTORS
HIROSHI YAMAMURA
KEEZI KANEKO
BY
Buckman and Archer
THEIR ATTORNEYS

3,325,113
FILM MAGAZINE FOR A MOVIE CAMERA

Hiroshi Yamamura and Keezi Kaneko, both of Kanagawa-ken, Japan, assignors to Fuji Shashin Film Kabushiki Kaisha, Kanagawa-ken, Japan
Filed Sept. 24, 1965, Ser. No. 490,028
13 Claims. (Cl. 242—71.2)

The present invention relates to an improvement in or relating to a film magazine for a movie camera, and more particularly, to such a film magazine in which friction between the film and/or the film core and the magazine body is reduced and thus smooth film movement is obtained.

Various types of film magazines for move cameras are now in practical use, however, in these film magazines, frictional force created between the film and/or the film core and the magazine body has substantial effect on the stability and the movement of the film since the film is intermittently driven for relatively long period with relatively high speed. In order to obviate the adverse effect due to high frictional force, it has been proposed to apply the lubricant on the interior surface of the film magazine. However, in this case, if the conventional kind of lubricant is used, the emulsion applied on the film surface is chemically affected by the lubricant receiving an undesirable effect.

Accordingly, the present invention is aimed to eliminate the above described difficulties and has an object to minimize, in a film magazine for a movie camera, the frictional force between the film and/or the film core and the magazine body so as to obtain smoother film movement.

A further object of the present invention is to apply on the inner surface of the film magazine for a movie camera a layer of lubricant that is effective to reduce the frictional force but has no undesirable effects on the film emulsion.

The inventors found, through continued investigations to attain the above described objects, that the satisfactory result can be obtained by applying the solution of sodium salt of alkyl sulfate ester represented by the general formula $ROSO_3Na$ (wherein R represents a straight chain aliphatic hydrocarbon group having 8 to 18 carbon atoms). Thus, by applying the sodium salt of alkyl sulfate ester as described above onto the inner surface of the magazine and the end surfaces of the film core, smoother film movement is obtained within the film magazine without giving any undesirable effect on the film emulsion and thus film stability during the operation of the camera is facilitated.

In order that the present invention may be more clearly understood and readily carried into effect, it will now be described with reference to the accompanying drawings in which:

FIG. 1 is a partially broken side elevation of a film magazine embodying the present invention;

FIG. 2 is a sectional view taken along the line II—II of FIG. 1; and

FIG. 3 is an exploded view of a second embodiment of the present invention showing the construction and the interior of the magazine.

Referring to the drawings, particularly to FIGS. 1 and 2, a magazine 1 is shown as constituted by two magazine halves or bodies 2 and 3 which are mated with each other by means of light-proof engagement at their flange portions 2a and 3a. In the illustrated embodiment, the general shape of the magazine is like a figure 8 as shown in FIG. 1, and a substantially circular fresh film compartment 1a and a substantially circular takeup film compartment 1b are defined within it. At the center portion of the fresh film compartment 1a, the bodies 2 and 3 are integrally provided with hollow stub shafts 2b and 3b concentrically aligned with each other, and a film core 4a is rotatably supported on the stub shafts 2b and 3b. At the center portion of the takeup film compartment 1b, the bodies 2 and 3 are integrally formed with similar hollow stub shafts 2c and 3c concentrically aligned with each other to provide a support for the second film core 4b which is rotatable on the shaft 2c and 3c.

A friction ring 12a is disposed around the stub shaft 2b between the magazine body 2 and the core 4a so as to provide light resistance against the free rotation of the core 4a. A similar friction ring 12b is disposed around the stub shaft 2c between the magazine body 2 and the core 4a.

The magazine is formed with a film outlet passage 5 at the side of the fresh film compartment 1a by means of a pair of parallelly extending straight flanges 5a and 5b and a film inlet passage 6 at the side of the takeup film compartment 1b by means of a pair of parallelly extending straight flanges 6a and 6b. The passages 5 and 6 are arranged with axially aligned and spaced relation to define an exposing area 7. An arcuate guide portion 8 is formed between the flanges 3a and 5b so as to guide the fresh film from the fresh film compartment 1a to the passage 5, and a guide pin 9 is provided between the passage 6 and the cranked film compartment 1b so as to guide the takeup film into the compartment 1b. The flanges 5a, 5b, 6a and 6b engage with correspondingly shaped flanges of the body 2 in a light-proof manner as in the case of engagement between the flanges 2a and 3a.

As shown in FIG. 1, a fresh film 10 is wound around the core 4a in the fresh film compartment 1a and guided by the portion 8 into the passage 5. Then the film 10 passes through the exposing area 7 and the passage 6 into the takeup film compartment 1b and is secured at its one end on the core 4b rotatably mounted on the stub shaft 2c and 3c.

The film magazine constructed as described above is charged in the movie camera such as shown by phantom line in FIG. 1 and the film 10 is intermittently driven by means of a drive mechanism of the camera having a claw (not shown) which is adapted to engage with the perforations of the film. The core 4b is also driven by the camera drive mechanism through a friction clutch which allows relative slippage between the drive mechanism and the core 4b as necessary.

In accordance with the present invention, the inner surfaces of the bodies 2 and 3, the surfaces of the cores 4a and 4b which are in contact with the inner surfaces of the magazine, the guide portion 8 and the guide pin 9 are applied with layers 11 of sodium salt of alkyl sulfate ester represented by the general formula $ROSO_3Na$ (wherein R represents a straight chain aliphatic hydrocarbon group having 8 to 18 carbon atoms). Thus, in the magazine in accordance with the present invention, the frictional force between the film 10 or the cores 4a and 4b and the inner surfaces of the bodies 2 and 3 are remarkably reduced, and moreover, said layers 11 of sodium salt of alkylsulfate ester have no adverse chemical effect on the film emulsion. The layers may be applied on whole inner surfaces of the magazine bodies, however, it is desirable to apply them only to the film inlet passage 6 and the takeup film compartment 1b. More preferably, the layers 11 are applied on such area encircled by a circle concentric with the core 4b and having a diameter substantially same as that of the completely wound film A as shown in FIG. 3. In this instance, the film will be free from powders of applied material which are scraped off the magazine surfaces during the operation of the camera.

In the example shown in FIG. 3, the arcuate guide portion 8 is replaced by a guide pin 13 and the friction rings 12a and 12b are replaced by a spring 14.

The materials which are successfully employed as the lubricant of the present invention are, for example, sodium salt of lauryl sulfate, sodium salt of octyl sulfate, sodium salt of myristyl sulfate, sodium salt of cetyl sulfate, sodium salt of decyl sulfate, sodium salt of octadecyl sulfate and the like; and alcohols such as methanol and ethanol or water may be used as the solvent therefor.

As apparent from above description, in the film magazine of the present invention, the film can be driven with light and even force and moreover the film receives no adverse chemical effects.

The details of the structure may be modified substantially without departing from the spirit of the invention and exclusive use of such modifications as come within the scope of the appended claims is contemplated.

What we claim is:

1. A film magazine for a movie camera wherein the inner surface of the magazine is at least partially coated with a solution of sodium salt of alkyl sulfate ester represented by the general formula;

$$ROSO_3Na$$

wherein R represents a straight chain aliphatic hydrocarbon group having 8 to 18 carbon atoms.

2. A film magazine for a movie camera in accordance with claim 1, wherein two film cores are rotatably supported and at least one of the surfaces which are in contact with the inner surface of the magazine is coated with said solution of sodium salt of alkyl sulfate ester.

3. A film magazine for a movie camera comprising two magazine bodies mated with each other by means of light-proof engagement at their flange portions, said magazine bodies defining a fresh film compartment and a takeup film compartment between them, a rotatable film core for the fresh portion of the film mounted within said fresh film compartment, a further rotatable film core for the takeup portion of the film mounted within said takeup film compartment, said fresh film compartment being provided with a film outlet passage and said takeup film compartment being provided with a film inlet passage, said outlet and inlet passages are disposed so as to define an exposing area for the film, and guide means for directing the film from the fresh film compartment through said film outlet passage, said exposing area and said film inlet passage into the takeup film compartment, the inner surfaces of said magazine bodies being applied with solution of sodium salt of alkyl sulfate ester represented by the following general formula;

$$ROSO_3Na$$

wherein R represents a straight chain aliphatic hydrocarbon group having 8 to 18 carbon atoms.

4. A film magazine for a movie camera in accordance with claim 3, wherein at least one of said film cores is coated on at least one end surface which is in contact with the inner surfaces of the magazine bodies with said solution of sodium salt of alkyl sulfate ester.

5. A film magazine for a movie camera in accordance with claim 3, wherein said guide means is coated with said solution of sodium salt of alkyl sulfate ester.

6. A film magazine for a movie camera in accordance with claim 3 wherein said magazine bodies are coated with said solution only on the wall surfaces of said takeup film compartment and the film inlet passage.

7. A film magazine for a movie camera in accordance with claim 3 wherein said solution is applied only on the areas of the wall surfaces of the takeup film compartment bounded by a circle concentric with said further rotatable film core and having a diameter the same as that of the completely wound film.

8. A film magazine for a movie camera in accordance with claim 1 wherein said sodium salt of alkyl sulfate ester is sodium salt of lauryl sulfate.

9. A film magazine for a movie camera in accordance with claim 1 wherein said sodium salt of alkyl sulfate ester is sodium salt of octyl sulfate.

10. A film magazine for a movie camera in accordance with claim 1 wherein said sodium salt of alkyl sulfate ester is sodium salt of myristryl sulfate.

11. A film magazine for a movie camera in accordance with claim 1 wherein said sodium salt of alkyl sulfate ester is sodium salt of cetyl sulfate.

12. A film magazine for a movie camera in accordance with claim 1 wherein said sodium salt of alkyl sulfate ester is sodium salt of decyl sulfate.

13. A film magazine for a movie camera in accordance with claim 1 wherein said sodium salt of alkyl sulfate ester is sodium salt of octadecyl sulfate.

References Cited

UNITED STATES PATENTS

| | | | |
|---|---|---|---|
| 1,694,401 | 12/1928 | Slocum | 242—71.1 |
| 2,778,636 | 1/1957 | Eash | 242—55.13 |
| 3,001,440 | 9/1961 | Foster | 242—71.2 |
| 3,027,110 | 3/1962 | Andrews | 242—55.13 |

FRANK J. COHEN, *Primary Examiner.*

N. L. MINTZ, *Assistant Examiner.*